United States Patent [19]
Gotham et al.

[11] 3,726,376
[45] Apr. 10, 1973

[54] CONVEYOR ASSEMBLY

[75] Inventors: Robert W. Gotham, Summit; Robert J. McKnight, Freehold; Frank J. Neuwirth, Manasquan, all of N.J.

[73] Assignee: Unex Conveying Systems, Inc., Edison, N.J.

[22] Filed: Mar. 19, 1971

[21] Appl. No.: 126,006

[52] U.S. Cl. ................................................193/35 R
[51] Int. Cl. ..............................................B65g 13/00
[58] Field of Search..............................211/49, 49 D

[56] References Cited

UNITED STATES PATENTS 2,827,153   3/1958   Olk et al. ..................193/35 R X
3,258,097   6/1966   Wahl.............................193/37
2,964,154   12/1960  Erickson....................193/37 X

FOREIGN PATENTS OR APPLICATIONS 762,005   11/1956   Great Britain....................193/37

Primary Examiner—Richard E. Aegerter
Assistant Examiner—H. S. Lane
Attorney—Robert J. McKnight

[57] ABSTRACT

A Roller Conveyor assembly including rollers mounted rotatably on axles, side rails formed with pockets for the ends of the axles, and means integral with the frames to prevent vertical and longitudinal displacement of the axles.

4 Claims, 3 Drawing Figures

PATENTED APR 10 1973 3,726,376

INVENTORS
ROBERT W. GOTHAM
ROBERT J. McKNIGHT
BY FRANK J. NEUWIRTH

Towson Price
ATTORNEY

CONVEYOR ASSEMBLY

SETTING AND OBJECTS OF THE INVENTION

This invention relates to conveyors and, more particularly, to those of the low-cost gravity roller type such as are used in live storage racks.

In addition, it relates to a roller conveyor structure and, more-particularly, to structural arrangements for supporting conveyor rollers upon the side rail members of a conveyor assembly.

An object of this invention is to provide an improved roller conveyor assembly at low cost suitable for use in live storage racks or display stands.

BACKGROUND OF THE INVENTION WITH REFERENCE TO PRIOR ART

Gravity roller conveyors usually consist of a pair of parallel side rails in which tubular rollers are mounted. Such rollers usually rotate on shafts which are supported in holes pierced in said side rails, and the shafts must be restrained against lateral movement so that they are properly retained. The tubes forming the rollers are rotatable on the shafts, usually on some type of ball-bearing to reduce friction. The hubs of the ball-bearings serve to restrain the rollers against lateral thrust action caused by sideways tilt of the conveyors or forces exerted in a transverse direction against the roller surface.

Various means such as nuts, cotter pins, snap-rings and the like, have been used to restrain the axles against lateral movement, or the rollers may be spring-loaded, usually by peening the shafts inside the rollers and using a coil spring to maintain each roller in a centered position with relation to its shaft, yet allowing the shaft to be inserted in its frame. This may be effected by inserting one end of a shaft in a hole in one rail, then depressing the other end of the shaft until it can be inserted in a hole in the opposite rail. The spring then acts to return the shaft to the "centered" position. Also see the Sekulski U.S. Pat. No. 3,002,792, which requires expensive "pockets" in the rails. All of the foregoing add substantially to the cost of manufacture.

Our axles require no fabrication of any kind, other than cutting to the desired length, and the punched axle "pockets" in the rails could not be made in a less expensive way.

While the present invention relates generally to conveying apparatus, it more particularly concerns an improved low cost roller-type gravity conveyor comprising a track bed formed by a multiplicity of antifriction roller devices upon which various bulk articles, such as packages, boxes and the like, may be positioned and caused to progress longitudinally of a supporting shelf or bed from back, where the articles are loaded, to the front where they are distributed, all by gravitation force.

In the past, conveyors used in display racks have largely consisted of structural members, or rails, with wheels mounted thereon. Wheels varied in diameter from ¾ to 2 inches, with face widths from ½ to 1 inch. Wheels varied in composition from plastic wheels with integral plastic hubs; plastic wheels with steel hubs; to steel ball-bearing wheels with fixed steel hubs. Plastic wheels were inexpensive if small in diameter and of narrow width. However, in such cases, the indentation made in cartons carried thereon, for instance, was such that the wheels had to be located on close centers, which resulted in costs higher than if spaced further apart.

Furthermore, integral hubs required that the wheels rotate in a downwardly recessed pocket so that dust tended to settle in the pockets, thus increasing the coefficient of friction between the hubs and the bearing surfaces supporting said hubs, with the result that the pitch required for a satisfactory flow of products inclreased with time. Ultimately readjustment in the track-supporting structure was required to increase the pitch. Alternately, plastic wheels on steel axles were substantially larger in diameter and more expensive, whereas steel wheels with ball-bearing hubs, while capable of operating at less pitch, were even more costly. Both of these were still subject to "carton indentation" which retarded free flow at a normally acceptable pitch.

Furthermore all of the wheel-type "live rail" track required two or more rails per runway and necessitated some means of maintaining the rails parallel. This required some means of spacing the rails relative to one another, or fastening the rails to the supporting structure. The latter expedient made it difficult and costly to readjust the track, to accommodate products of a different size, as frequently became necessary. Additionally, fasteners at interior supports in the rack were difficult to adjust because of inaccessability.

A further disadvantage of plastic wheels with integral hubs was that the hubs tended to break off under shock loads, as were encountered at the charging end of the rack. The foregoing shows some of the reasons for the development of our invention.

DETAILED DESCRIPTION OF A PREFERRED EMBODIMENT

Figure 1:
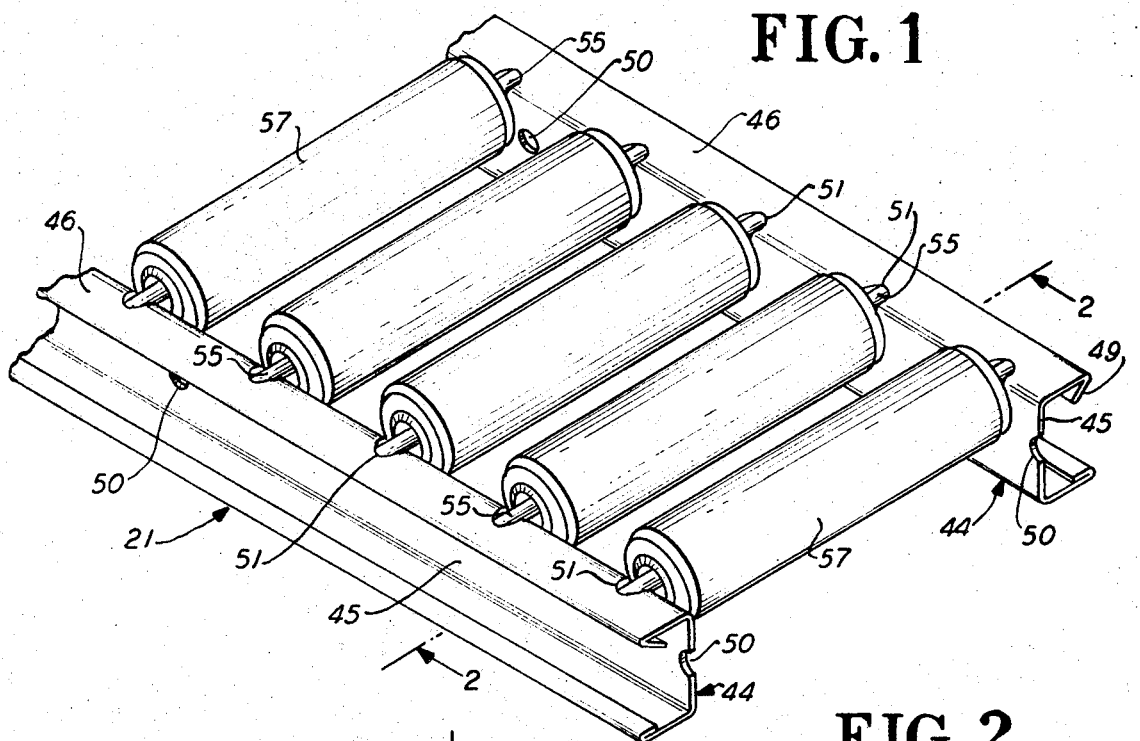
FIG. 1 is a perspective view from the front toward the left of one of the roller conveyor assemblies with the cross-bracing omitted.
Figure 2:
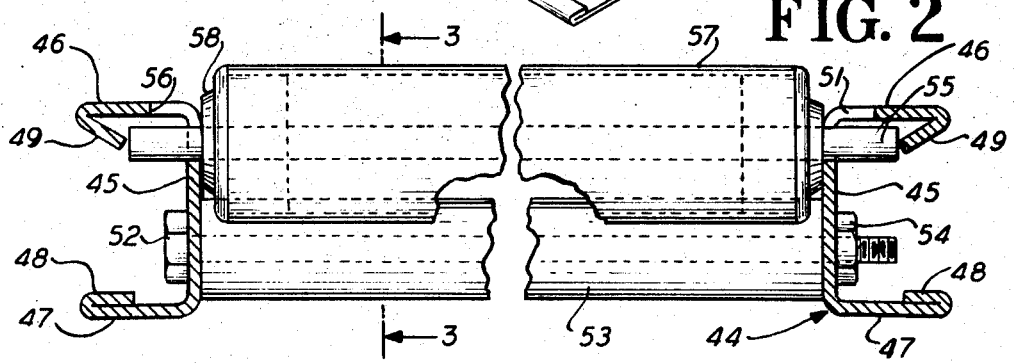
FIG. 2 is a transverse vertical sectional view on the line 2—2 of FIG. 1, in the direction of the arrows, showing one of the cross braces.
Figure 3:
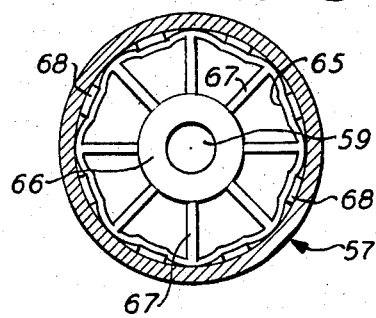
FIG. 3 is a transverse sectional view of one of the rollers, as on the line 3—3 of FIG. 2, in the direction of the arrows.

FIGS. 1 and 2 show two views of a preferred embodiment of our novel roller runways or conveyor assemblies 21.

Each assembly comprises a pair of preferably channel-shaped side rails 44, each having a normally vertical web or plate member 45 and flange 46 outstanding therefrom at its upper edge. If the rails 44 are channel-shaped, each also has a lower flange 47 outstanding therefrom, the outer edge of which is desirably stiffened, as by being bent back on itself as indicated at 48. The flange 46 of each rail has a depending outer edge portion or lip 49, which may extend diagonally, as illustrated, or straight down, as desired. There is a row of holes 51 disposed along the top portion of each rail and correspondingly spaced. Each hole 51 is desirably oval or elongated transversely in the blank from which the rail is formed and so located that, after forming, a portion is in the plate member or web 45 at the top thereof and the remainder in the flange 46.

There is also a series of more-widely spaced generally-circular holes 50 lying entirely in each plate member or web 46 below the holes 51, so as to receive bolts 52. Each hole 50 desirably lies on a vertical axis disposed midway between the vertical axes of an adjacent pair of holes 51. Each bolt is headed at one end, carries a sleeve 53, preferably aluminum, between the rails and has its other end threaded and carrying a nut 54 outside the opposite rail. These bolts 52, their sleeves 53 and nuts 54 form cross braces extending between the rails and holding them at the distance desired with their top holes 51 in transverse alinement. The holes 50, and the braces held therein, are spaced along the rails 44 greater distance than the axles 55. In this embodiment, the spacing between holes 50 is shown as four times that between axles 55. There is a series of axles 55, each extending from one rail to the other and with its ends received in an alined pair of top or elongated holes 51, so that it is locked in place against longitudinal movement by the depending portions 49, and against upward movement by an overlying portion 56 of each flange 46.

A roller 57 is rotatably carried on each axle 55. Each roller 57 may be formed by bending a sheet of aluminum to make a hollow tube or cylinder and welding the meeting edges of said sheet to hold them together. The outer surface only of each cylinder is polished, leaving the inner surface rough along the meeting edges of the sheet where flashing may appear. Each roller 57 is completed by frictionally mounting in each end an antifriction bearing 58, here shown as formed of plastic material having a low coefficient of friction with respect to the metal of its axle 55, desirably galvanized steel.

The axles 55 with their rollers 57 and bearings 58 are desirably assembled with respect to the side rails 44 by first loosely assembling said rails with their bolts 52, sleeves 53 and nuts 54, leaving a gap or gaps between said sleeves and the rails. The axles 55, while carrying their rollers are then dropped into the pockets created by so positioning the elongated holes 51. The nuts 54 on the bolts 52 are then tightened to draw the rails against the ends of the sleeves 53 and hold them in rigid framed relationship. At the same time, this tightening holds the axles 55 and their rollers 57 restrained against both undesired upward and longitudinal movement.

ADVANTAGES OF DEVICES EMBODYING THE INVENTION

1. The side rails are inexpensive, requiring no weldments for "pockets" or complicated punch dies and they can be roll-formed efficiently.
2. The axles are the low-cost material, being merely cut to length from stock, as compared to bolts, pierced rods and the like.
3. The rails themselves serve as axle retainers via the lip on the upper flange; hence there is no labor required to apply nuts, cotter pins, hog rings or other types of retainers, Nor are spring-loaded shafts required, along with cumbersome and expensive methods of inserting in the rails.
4. The rollers can be easily replaced by "pinching" the lip to extract shaft; then a new roller is inserted and pliars or a screw driver can be used to "-spread" the lip to its original position.

It will thus be seen that our roller assembly and its elements involve substantial improvements over the prior art as known.

Having now described our invention in detail in accordance with the requirements of the Patent Statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims.

We claim:

1. A conveyor assembly comprising a pair of side rails each having a normally vertical plate member and an upper flange outstanding therefrom, the flanges of said rails each having a depending outer edge portion, a row of holes disposed along the top portion of each rail and correspondingly spaced, said holes being so located that when the rails are formed, a portion of each is in the plate member and the remainder in the flange of its rail, means for maintaining said rails in spaced parallel relationship, with said holes in transverse alinement, a series of axles extending from each rail to the other and with the ends of each received in an alined pair of holes, said depending portions extending to said axles, said axles being no longer than the spacing of said depending portions but slightly longer than the distance from a hole in said flange to the depending portion of the opposite flange, whereby the axles are locked in place against longitudinal movement by the downwardly depending outer edge portions and against vertical movement by overlaying portions of the upper flanges, and a series of rollers carried on said axles.

2. A conveyor assembly as recited in claim 1, wherein the means for maintaining said rails in spaced parallel relationship comprises a series of generally-circular holes lying entirely in each plate member, cross braces extending between said rails, with their ends secured to said rails at the positions of said circular holes.

3. A conveyor assembly as recited in claim 1, wherein each side rail is channel shaped, each plate member is a web, a lower flange also outstands from each web, the depending outer edge portion of said upper flange is a lip or narrow flange, the holes are oval or elongated transversely of the rails, and there are generally circular holes each positioned between but lower and spaced along the side rails.

4. A conveyor assembly as recited in claim 1, wherein said means for maintaining said rails in spaced parallel relationship includes bolts passing through sleeves thereof and on which nuts had been threaded, leaving a substantial gap between sleeves and rails whereby the rollers on their axles may be then dropped so that the axle ends fit into the pockets created by so positioning the elongated holes in blanks before forming said rails and the bolts being then tightened to hold the rails in rigid framed relationship, at the same time holding the axles and their rollers restrained against undesired upward and longitudinal movement.

* * * * *